(No Model.) 2 Sheets—Sheet 1.

FAUNT LE ROY SENOUR.
POTATO DIGGER.

No. 448,551. Patented Mar. 17, 1891.

Witnesses
Willet Norton
Vinton Coombs

Inventor:
Faunt LeRoy Senour
by his Attorney Franck D. Johns (No Model.) 2 Sheets—Sheet 2.

FAUNT LE ROY SENOUR.
POTATO DIGGER.

No. 448,551. Patented Mar. 17, 1891.

Witnesses:

Inventor:
Faunt Le Roy Senour
by his Attorney

UNITED STATES PATENT OFFICE.

FAUNT LE ROY SENOUR, OF NEW ALEXANDRIA, PENNSYLVANIA.

POTATO-DIGGER.

SPECIFICATION forming part of Letters Patent No. 448,551, dated March 17, 1891.

Application filed April 3, 1890. Serial No. 346,416. (No model.)

*To all whom it may concern:*

Be it known that I, FAUNT LE ROY SENOUR, a citizen of the United States, residing at New Alexandria, in the county of Westmoreland and State of Pennsylvania, have invented certain new and useful Improvements in Potato-Diggers; and I do hereby declare the following to be a full, clear, and exact description of the invention, such as will enable others skilled in the art to which it appertains to make and use the same.

This invention relates to an improved machine for digging and collecting potatoes; and it has for its objects to provide for cutting and removing the weeds and surface vegetable growth from the hills, initially; then for plowing up and loosening the potatoes from the soil and distributing them in a row in the path of the machine, and, finally, to provide for collecting and distributing the potatoes free from soil to receptacles at the sides of the machine, as more fully hereinafter set forth.

The above-mentioned objects I attain by the means illustrated in the accompanying drawings, in which—

Figure 1:
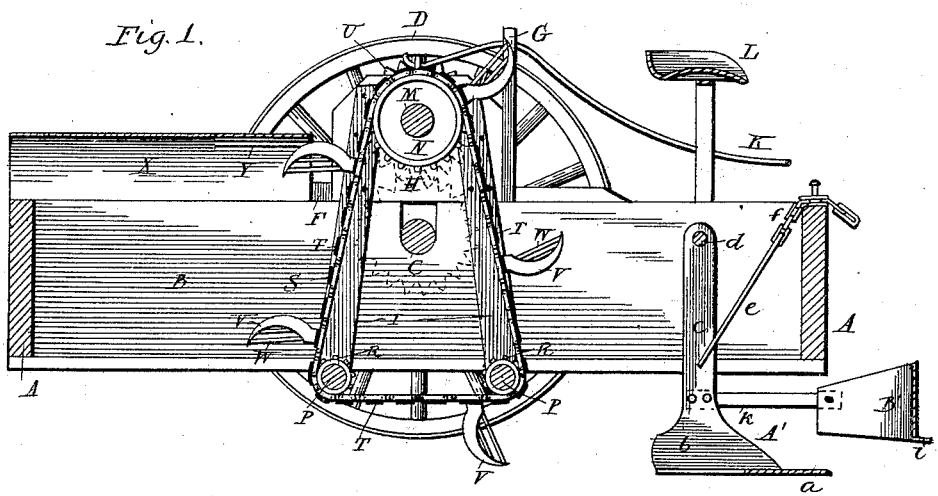
Figure 2:
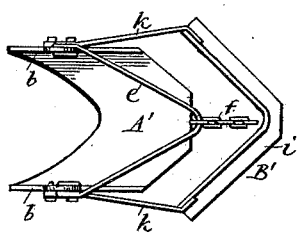
Figure 3:
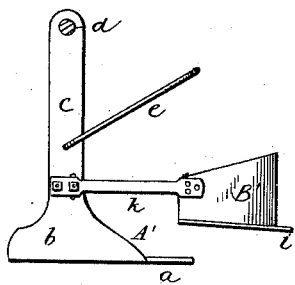
Figure 4:
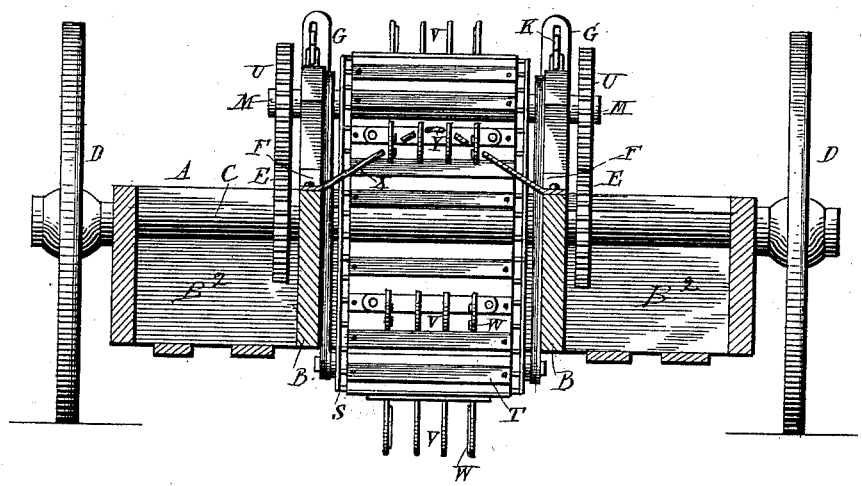
Figure 5:
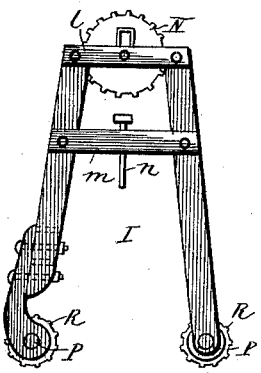
Figure 6:
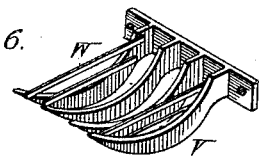

Figure 1 represents a vertical sectional view of my improved potato-digger, taken longitudinally and centrally through the same. Fig. 2 represents a top view of the weed-cutting and potato-digging plows detached. Fig. 3 represents a side elevation of said plows, showing the means whereby the weed-cutting plow may be adjustably secured to the digging-plow. Fig. 4 represents a transverse vertical sectional view of the machine, taken on the line $x$ $x$ of Fig. 1. Fig. 5 represents a detached view of a modification of an adjustable frame forming part of the machine, and which carries the collecting and distributing devices thereof; and Fig. 6 represents a perspective view of one set of collecting and distributing fingers detached.

Referring to the drawings, the letter A indicates a rectangular frame, which may be constructed of wood or any other suitable material, and which constitutes the body of the machine. Within the said frame and parallel with its sides are located two beams B, which are connected at their ends to the ends of the frame A, a central space being left between the said beams and between the beams and the sides of the frame A, the collecting and distributing devices being located between the beams, the spaces at each side thereof serving, in connection with suitable bottoms, to form receptacles $B^2$ for the collection of the potatoes, as more fully hereinafter explained.

The letter C indicates a transverse axle journaled so as to turn in bearings in the sides of the machine and the parallel beams thereof before mentioned, and D indicates two supporting and driving wheels mounted on and secured to the ends of said axle, so as to turn the axle with them as the wheels rotate in traveling over the field. To the said axle, adjacent to the outside of each beam, are secured cog or spur-gear wheels E, the object of which will hereinafter appear.

The letter F indicates two guide-blocks or short standards, secured one to each of the beams B at the upper edge thereof at the rear of the axle, and G two vertical standards, secured one to each of said vertical beams forward of the said axle. Between these guide-blocks and standards are located the head-blocks H of a vertical frame I, located between the beams B and setting closely but loosely against the inner sides thereof. The said frame is composed of two trapezoidal sides, preferably as shown in Fig. 1 of the drawings, which are secured firmly to the head-blocks H in any convenient manner, the base or broader portion of the frame extending downward toward the surface of the field over which the machine is to traverse.

Through suitable openings in the standards G extend the arms of a lever-frame K, the said arms being fulcrumed in the openings and extending backward over the head-blocks H, to which they are loosely connected in any convenient manner. The front of said lever-frame passes transversely in front of the driver's seat L, so as to be under the control of the foot of the driver to permit the lever to be readily operated to elevate or drop the head-blocks and frame when required. The head-blocks near their upper ends are provided with bearings, in which is journaled a transverse shaft M, which is provided with sprocket-wheels N, and at the base of the frame I between the ends of the trapezoidal sides thereof, which are provided with bearings for the purpose, are journaled two rollers P, which are provided with sprockets R in the same vertical plane as the respective sprocket-wheels N on the shaft before mentioned. Over the respective sprocket-wheels and sprockets extend two sprocket belts or chains S, which are connected at proper intervals by means of strips T of metal or other material, constituting an endless traveling band. Upon the outer ends of shaft I have mounted thereon fixed cog or spur gear-wheels U, which intermesh with the similar wheels on the axle of the machine before mentioned, and derive motion therefrom when the machine is in operation. The strips T occurring at regular intervals in the length of the endless band are provided with curved fingers V of such length and so disposed as to enter the hills consecutively as the machine passes over a row of potatoes in the field, pass below the potatoes after being loosened by the digging-plow, and gather and collect them, the strips carrying said fingers being so arranged relatively to each other that while one set of fingers is entering the set next ahead is gathering, and the set still ahead is carrying the potatoes upward to the distributing device at the rear of the machine, as more fully hereinafter explained. From the bases to the tips of the outside fingers of each series are extended and secured one or more side bars W, which, with the fingers, form a series of baskets in which the potatoes are gathered and carried upward and over to the distributer at the rear of the machine.

The letter X indicates the distributer, which consists of a platform supported at its edges upon and secured to the edges of the beams. The said platform rises at an angle terminating midway between said beams, so as to shed the potatoes carried up by the fingers and deposited thereon to the receptacles at each side of the machine. The forward edge of said platform is longitudinally slotted, forming tongues Y, which extend between the fingers, the fingers passing through the slots or spaces between the tongues as the machine is operated, so as to separate the greater portion of the soil from the potatoes and drop it through slots while discharging the potatoes upon the platform.

The letter A' indicates the digging-plow, which consists of a flat share $a$ of a width slightly greater than the row of potatoes to be dug. The forward edge of said share projects at an angle from its sides to a point midway between the same, and the rear edge is formed with a semi-elliptical recess, the forward edge serving to cut under, plow up, and loosen the potatoes, and the rear edge to gather the loosened potatoes in a row ready to be taken up by the collecting-fingers behind it. The share is provided with vertical sides $b$, having vertical arms $c$, which are loosely connected to a transverse bar $d$, secured to the beams I of the machine, and to the said arms is secured the end of a link $e$, having attached to it a check-chain $f$, which may be adjustably secured to a connection $g$ at the front of the frame A to adjust the position of the said plow A'.

The letter B' indicates an advance or cutting plow for the purpose of cutting and removing the surface growth from the hills. The said plow consists of a vertical share having angular sides with a forwardly-projecting apex $h$ and its lower edges forwardly flanged, as indicated by the letter $i$, the flanged edges serving to cut the surface growth and the angular sides to turn the same to each side out of the way of the gathering and collecting devices as the machine traverses the field. The plow B' is provided with rearwardly-extending arms $k$, which are adjustably secured to the arms of the plow A', so as to vary the relative positions of the same to the work to be accomplished, the two plows, however, when adjusted preserving their proper relative positions rigidly.

In the modification shown in Fig. 5 of the drawings the head-blocks H are dispensed with and in their place cross-bars $l$ and $m$ are substituted, the cross-bars $l$ carrying the upper sprocket-shaft and the bars $m$ resting upon the beams B, being confined thereto by means of vertical pins $n$, upon which they may ride vertically, so that the frame may be vertically raised and depressed. It is evident, however, that the construction of the frame may be otherwise modified. For instance, instead of having the sides trapezoidal in shape, they may be made angular with the apices uppermost, the essential object being to preserve the broad base, by means of which the lower portion of the belt is made to traverse the soil in a straight sweep for a distance corresponding to that between the lower sprocket-rollers, so as to insure the collection of the potatoes, which could not be effectually done if the fingers were carried in the arc of a circle through the soil by simply passing the sprocket-band around a single drum or roller.

I have described the fingers as being secured to one of the strips I forming part of the sprocket-band; but it is evident that the fingers and strip may be formed integral, each constituting a section, which may be secured to the belt at proper intervals between the connecting-strips thereof.

The angular distributing-platform at the rear of the machine may be slotted throughout, instead of being formed partly solid, in order to better sift the soil from the potatoes, and the bottoms of the side receptacles, as well as the ends, may be slotted or constructed of foraminous material in order to more effectually accomplish this object.

The operation of my invention is as follows: As the machine is drawn forward over the field, the advance plow cuts the surface growth and turns it to each side, out of the way. The digging-plow then follows, separating the potatoes from the soil, and by reason of its elliptical rear edge arranging them in a narrow row. The fingers on the sprocket-belt then successively gather up the potatoes in the row, the straight sweep given them by the arrangement of the lower sprocket-rollers insuring the collection of the same with absolute certainty, and after they are collected they are carried upward and backward by the fingers and deposited in the receptacles at each side of the machine.

When obstructions are met with in the pathway of the machine, the adjustable frame may be readily elevated by the driver through the medium of the foot-lever, so that the machine may pass over and the parts readily dropped into position after such obstructions have been cleared without injury to the parts, thus obviating frequent repairs which would otherwise be necessary.

In some instances, instead of having the sprocket-wheels and sprockets arranged near each end of the sprocket-wheel shaft and sprocket-rollers, they may be arranged midway between the ends of each, thus dispensing with one of the sprocket-wheels and two of the sprocket series on the rollers, which will lessen the cost of the machine.

Having thus described my invention, what I claim, and desire to secure by Letters Patent, is—

1. In a machine for digging potatoes, the combination, with the main frame thereof, of a vertically-adjustable frame mounted in said main frame and carrying upper and lower rollers, the lower rollers being mounted in a common horizontal plane, an endless band passing over said rollers, a series of digging and gathering fingers secured to said band and adapted to move during a portion of their travel with a horizontal sweep through the rows of potatoes, and mechanism for operating the band, all constructed, arranged, and operating substantially as shown and described.

2. In a machine for digging potatoes, the combination, with the main frame thereof, of a vertically-adjustable trapezoidal frame mounted in said main frame, a roller mounted in the upper portion of the adjustable frame, and two rollers mounted in a common horizontal plane in the lower part of said frame, an endless band passing over said rollers, a series of digging and gathering fingers secured to said band and adapted to move during a portion of their travel with a horizontal sweep through the rows of potatoes, and mechanism for operating the band, all constructed, arranged, and operating substantially as shown and described.

3. In a machine for digging potatoes, the combination, with the main frame thereof and a digging-plow secured to the forward end of the frame and having a flat share angular at the point and elliptically recessed at its rear, whereby the potatoes are dug and arranged in a narrow row, of a vertically-adjustable frame mounted in said main frame and carrying upper and lower rollers, the lower rollers being mounted in a common horizontal plane, an endless belt passing over said rollers, and a series of digging and gathering fingers secured to said belt and adapted to move during a portion of their travel with a horizontal sweep behind the digging-plow, all constructed, arranged, and operating substantially as shown and described.

4. In a machine for digging potatoes, the combination, with the main frame, potato-receptacles located on each side thereof, and an angular slotted distributing table or platform located at the rear of said main frame between and communicating with the potato-receptacles, of a vertically-adjustable frame mounted in the main frame and centrally located between the potato-receptacles, upper and lower rollers mounted in the adjustable frame, the lower rollers being mounted in a common horizontal plane, an endless band passing over the rollers, a series of digging and gathering fingers secured to said band and adapted to move during a portion of their travel with a horizontal sweep and to pass through the slots in the distributing-table, and mechanism for operating the band, all constructed, arranged, and operating substantially as shown and described, whereby the potatoes are first gathered by the digging and gathering fingers and carried up and deposited upon the distributing-table.

In testimony whereof I affix my signature in presence of two witnesses.

FAUNT LE ROY SENOUR.

Witnesses:
CHAS. W. SCOVEL,
MAY MAGEE.